(12) United States Patent
Duve

(10) Patent No.: US 6,326,622 B1
(45) Date of Patent: Dec. 4, 2001

(54) PIR DEVICE

(75) Inventor: Jeff Duve, Efland, NC (US)

(73) Assignee: Regent Lighting Corporation, Burlington, NC (US)

( * ) Notice: Subject to any disclaimer, the term of this patent is extended or adjusted under 35 U.S.C. 154(b) by 0 days.

(21) Appl. No.: 09/314,746

(22) Filed: May 19, 1999

(51) Int. Cl.⁷ ....................................................... G01J 5/10
(52) U.S. Cl. ...................................... 250/342; 250/DIG. 1
(58) Field of Search ................................ 250/DIG. 1, 342

(56) References Cited

U.S. PATENT DOCUMENTS 5,077,549 * 12/1991 Hershkovitz et al. ............... 340/567

FOREIGN PATENT DOCUMENTS

58097680A * 6/1983 (JP) ................................ 250/DIG. 1
06148341A * 5/1994 (JP) ................................ 250/DIG. 1

* cited by examiner

Primary Examiner—Constantine Hannaher
(74) Attorney, Agent, or Firm—Niro, Scavone, Haller & Niro

(57) ABSTRACT

An outdoor light using a motion sensor that activates the light when motion is sensed by changes in the infrared signal detected. The device uses a passive infrared detector network to sense infrared and to produce an analog signal in response to said infrared detected which is then passed through an amplifier to a signal controlled oscillator. The signal is converted into a digital signal which is used to detect motion by a logic device.

1 Claim, 1 Drawing Sheet

PIR DEVICE

BACKGROUND OF THE INVENTION

The invention is directed to a control circuit and method for converting an analog signal from a passive infrared ("PIR") detector into a digital signal. More specifically, the device converts infrared detected by a passive infrared detector into a digital signal through the use of an oscillator.

SUMMARY OF THE INVENTION

The present invention is directed at a novel control circuit that may be used in lighting devices that use a PIR to sense "motion" in order to activate the lighting element of the unit. The present invention solves the problems associated with the control circuitry currently used in such devices by eliminating the use of PIRs in combination with comparators to detect "motion". The present invention does this by coupling a PIR to a signal controlled oscillator that converts the analog signal generated by the PIR into a digital output that may be used by a microprocessor or other similar logic device. In current designs, PIRs are typically coupled to a number of comparators which are used to detect the presence of motion through changes in the infrared detected. However, there are several drawbacks to this type of design.

First, the use of comparators requires the use of additional components which increase the cost of the unit. Moreover, the use of comparators limits the unit's ability to supply useful and accurate information to a microprocessor or similar logic device. In addition, the comparators are affected by changes in environmental conditions such as changes in temperature, humidity and the like, which, in turn, create false readings. For example, at sub-zero temperatures, most prior art devices using comparators will cease functioning. In addition, if the environmental temperature exceeds that of the comparator's threshold level, the device will incorrectly sense motion and remain active until the environmental temperature falls within the preset thresholds.

The present invention solves the above mentioned shortcomings of the prior art designs by coupling PIR to an oscillator which produces a digital frequency that is inputted to a logic device. The logic device may employ variable threshold logic to sense changes in temperature as a function of time in order to detect motion. This differs significantly from prior art designs which use fixed thresholds to detect changes in temperature to detect "motion". Consequently, eliminating the use of a fixed threshold improves the accuracy of the device since it eliminates inaccurate triggering or failure to trigger situations.

DESCRIPTION OF A PREFERRED EMBODIMENT

Figure 1:
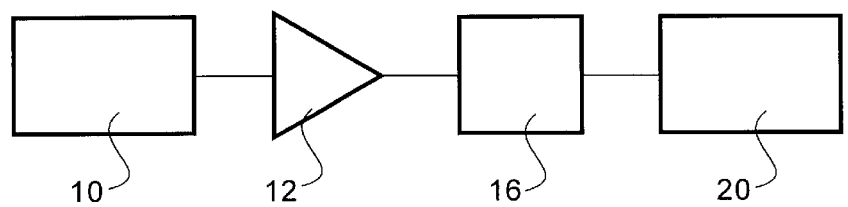
FIG. 1 is a block diagram showing a circuit of one embodiment of the present invention.
Figure 2:
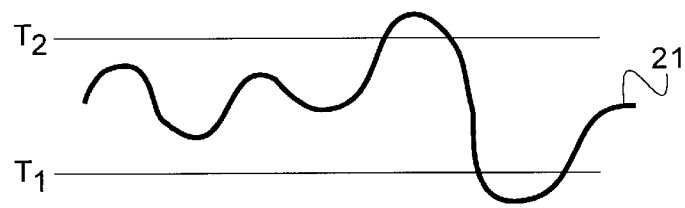
FIG. 2 is a graphical representation of how the prior art employs fixed thresholds to detect motion.

Referring to FIG. 1, a PIR 10 of a design known to those of skill in the art is used to detect changes in infrared and to produce a corresponding analog signal. The analog signal produced by PIR 10 is then supplied to an amplifier 12 which, in turn, sends the amplified signal to an oscillator 16 which may either be a voltage control oscillator or a current control oscillator. In a preferred embodiment, a single operational amplifier voltage control oscillator ("single Op-Amp VCO") may be used. The oscillator 16 then converts the analog signal produced by PIR 10 into a digital signal that may then be further transmitted to a microprocessor 20 or some other type of logic device. If a single Op-Amp VCO is used, it may be of a design disclosed in Applicant's co-pending application. In addition, either the current or voltage controlled oscillators may be of other designs currently known to the those of skill in the art.

Figure 3:
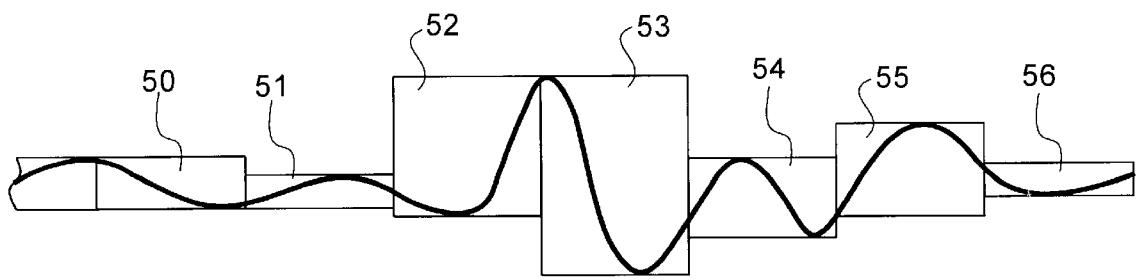
FIG. 3 is a graphical representation showing the variable thresholds created by the present invention.

Once the analog signal generated by PIR 10 is converted into a digital signal, it may then be used in a number of ways by microprocessor 20. One novel way in which to use the digital signal is to eliminate the use of comparators and fixed thresholds to detect motion. As discussed above, this will solve a number of design defects, including without limitation, false triggering by the light unit. To do this, the microprocessor simply needs to be adapted to sense a change in frequency over a discrete period of time. As shown in FIG. 3, variable thresholds 50–56 are created in which the device is programmed to detect changes in frequency over a constant period of time. For thresholds 50, 51, 54, and 55, no motion is detected since the frequency change was not great enough in the given time period. However, motion is detected in thresholds 52 and 53 due to the sharp change in frequency.

It should be understood that various changes and modifications to the preferred embodiment described would be apparent to those skilled in the art. Changes and modifications can be made without departing from the spirit and scope of the present invention and without diminishing its intended advantages. It is, therefore, intended that such changes and modifications be covered by the following claims.

What is claimed is:

1. A motion detector comprising:

a passive infrared detector adapted to sense infrared and to produce an analog signal in response to said infrared detected;

an amplifier for receiving said analog signal, and amplifying said signal;

an oscillator adapted to receive said analog signal and to convert said analog signal into a digital signal; and a logic device which senses motion as a function of change in temperature over a predetermined period of time without the use of a fixed threshold.

* * * * *